United States Patent [19]

Regge

[11] Patent Number: 4,667,084
[45] Date of Patent: May 19, 1987

[54] ELECTRICALLY HEATED HOSE FOR HEATING MELTED ADHESIVE AND ATOMIZING AIR FED TO A SPRAYING HEAD

[75] Inventor: Klaus-Dieter Regge, Lüneburg, Fed. Rep. of Germany

[73] Assignee: Meltex Verbindungs-Technik GmbH, Lueneburg, Fed. Rep. of Germany

[21] Appl. No.: 662,949

[22] Filed: Oct. 19, 1984

[30] Foreign Application Priority Data

Apr. 30, 1984 [DE] Fed. Rep. of Germany ....... 3416105

[51] Int. Cl.⁴ .......................... H05B 3/58; F16L 9/18; F16L 11/12; B67D 5/62
[52] U.S. Cl. ..................................... 219/301; 138/33; 138/114; 174/47; 219/421; 219/522; 222/146.5; 239/135
[58] Field of Search ............... 219/300, 301, 522, 421; 222/146.1, 146.5; 239/135, 136, 138; 138/33, 114; 174/47

[56] References Cited

U.S. PATENT DOCUMENTS

| | | | |
|---|---|---|---|
| 2,243,220 | 5/1941 | Pitman | 219/301 X |
| 2,516,864 | 8/1950 | Gilmore | 219/301 X |
| 2,546,741 | 3/1951 | Grossman | 219/301 X |
| 2,760,047 | 8/1956 | Hanson | 219/301 X |
| 2,778,609 | 1/1957 | Peeps | 219/301 X |
| 3,378,673 | 4/1968 | Hopper | 219/522 X |
| 3,592,238 | 7/1971 | Scheffler et al. | 138/114 |
| 3,727,029 | 4/1973 | Chrow | 219/301 |
| 4,194,536 | 3/1980 | Stine et al. | 219/301 X |
| 4,308,447 | 12/1981 | Notzold | 219/421 |

FOREIGN PATENT DOCUMENTS 2836545 3/1980 Fed. Rep. of Germany .

Primary Examiner—Anthony Bartis
Attorney, Agent, or Firm—Michael J. Striker

[57] ABSTRACT

An electrically heated hose for simultaneously heating and feeding melted adhesive and pressurized air to an adhesive spraying head includes a tubular central flexible plastic core for feeding the adhesive therethrough, a resistance heating type helically wrapped around the core with adjacent turns spaced from each other and an outer layer of thermal insulation surrounding the tape and core so that a helically-shaped air passage is formed between adjacent spaced helical turns of the heating tape, the inner wall of the outer layer and the outer wall of the core. A pressurized air admitting tube is connected to one end of the helical passage and a pressurized air discharge tube is provided at the opposite end thereof for supplying the pressurized air in a preheated condition to the spraying head for atomization of the melted adhesive.

4 Claims, 3 Drawing Figures

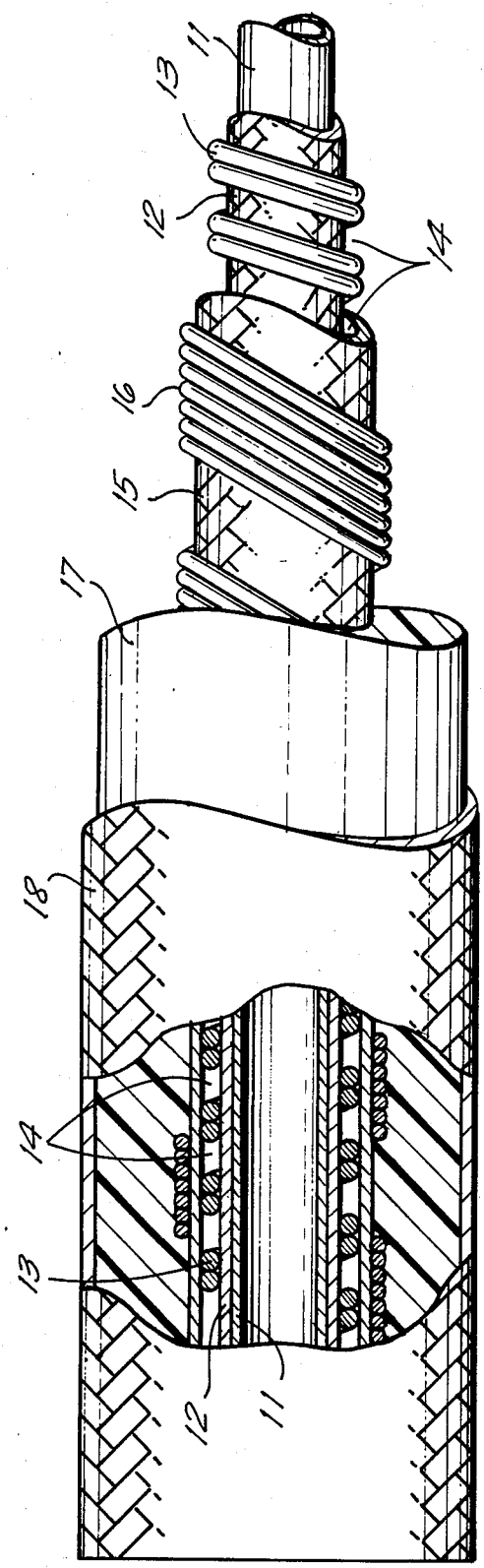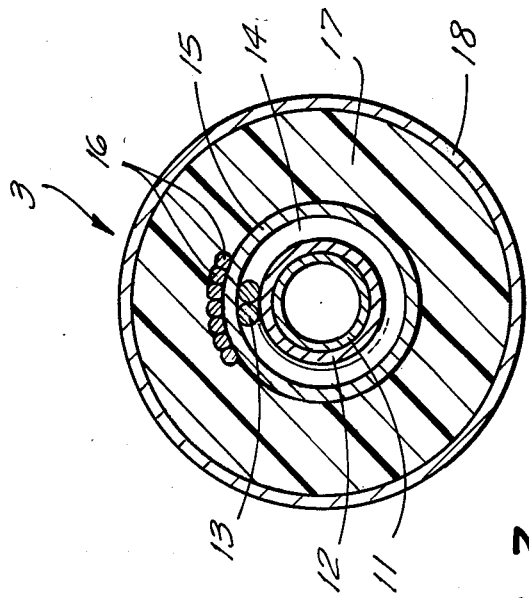
FIG. 2
FIG. 3

4,667,084

ELECTRICALLY HEATED HOSE FOR HEATING MELTED ADHESIVE AND ATOMIZING AIR FED TO A SPRAYING HEAD

BACKGROUND OF THE INVENTION

The present invention relates to a hose for feeding melted adhesives from an adhesive-liquifying apparatus to an adhesive-spraying head.

An adhesive conveying hose connects an apparatus for liquifying adhesive masses, such as disclosed in DE-OS No. 28 36 545, with a spraying head for the application of melted adhesive onto the surface of a material. The known hose of the type under consideration includes a central core which is made of a flexible plastic tube which is resistant to the temperatures up to 250° C. This core is surrounded by a steel sleeve and made such that it resists to the inner pressure up to 160 bar. A heating strip or tape is provided in the hose, which is in heat-conducting connection with the central core. The heating tape is helically wrapped around the central core, which is employed to maintain the adhesive in a melted condition.

The heating tape and the central core are covered with a layer of thermal insulation while a protective sleeve of synthetic plastic material or a steel-plate lining is provided on the the outer surface of the layer of thermal insulation. The protective sleeve is provided to prevent heat losses.

The hose can preferably have conduits inside the layer of thermal insulation, these conduits can be provided with temperature feelers or control devices for controlling the operation of the adhesive-spraying head.

In the operation of the apparatus for liquifying masses of adhesive a hot and flowable melted adhesive is supplied under high pressure into the central core of the hose, this adhesive being conveyed by the hose to the adhesive-application head. It is ensured during this operation that the melted adhesive is continually maintained at the range of optimal temperatures by means of the heating tape, temperature feelers and an adjustment device. The inner diameter of the central core is preferably in the range of about 8 mm.

When an adhesive-spraying head is employed as an adhesive-application tool hot melted adhesive should be atomized and applied to the surface of an object in an atomized form.

If cold air is utilized for atomizing a melted adhesive, for example atmosphere air, a non-satisfactory adhesive coat would result on the surface of the object, which would lead to a fast solidifying of the adhesive which is not desired. To avoid this air supplied to the adhesive-spraying head should be preliminarily heated in a special device.

The disadvantage of the known method is not only the fact that the conventional adhesive-application head has been provided with two hoses in place of one, but also that a suitable heating device for heating the supply of pressure air has been required, which heating device must have been also temperature-controlled.

SUMMARY OF THE INVENTION

It is an object of the present invention to provide an improved hose for conveying melted adhesive from an adhesive-liquifying apparatus to an adhesive-spraying head.

It is another object of the present invention to provide a hose for melted adhesive, with which the utilization of a specific air-heating device and a specific hose for supplying heated air to the adhesive-spraying head would be avoided.

These and other objects of the invention are attained by a hose for conveying a melted adhesive from an adhesive-liquifying device to an adhesive-spraying head, which hose comprises a flexible tubular central core of plastic, a helical electrical heating tape provided on the central core, an outer layer of thermal insulatiion surrounding the heating tape, an inlet end for connection to the adhesive-liquifying device and an outlet end for connection with the adhesive-spraying head the hose is provided with an air passage formed inside the outer layer and disposed in heat-transmitting relation with said heating tape. The hose further includes an air-admitting device provided on the hose in the region of the inlet end and connected to said passage and an air-discharging device provided on the hose in the region of the outlet end and connected to said passage so that air entering the air-admitting device is heated while flowing through the air passage and enters the adhesive-spraying head via the air-discharging device in preheated condition to atomize an adhesive sprayed out from adhesive-spraying head.

The hose for melted adhesive according to the present invention has two passages in place of a single passage provided in conventional hoses of the foregoing type. The second passage serves for feeding pressure air and is in heat-transmitting connection with the heating tape and thereby is heated immediately by the heating tape or by the melted adhesive fed through the central core.

The hose provides not only for a structural combination of two separated hoses but also provides additionally a device for preheating pressure air, which utilizes heat of the heating tape which had always been provided in the hoses of this type, without requiring special individual structural elements.

The invention offers a simple solution of the problem of preheating air for atomizing an adhesive to be applied to a surface of an object. Only the adhesive-liquifying device, the adhesive-spraying head and the single hose are required, while the pressure-air heating device, normally employed in conventional apparatus, can be omitted.

It can be advantageous, particularly with short hoses, to provide the first portion of the air passage of a greater cross-section than that of the remainder of the passage so as to enable an intensified or additional air heating in the region of the greater cross-section. Such an enlarged portion would form a preheating chamber for cold pressure air which, after leaving the preheating chamber and entering the remaining portion of the passage, would be maintained at desired final temperature.

The passage has a cross-section which may be substantially constant over the length of the passage. This is advantageous for long hoses; in this case the hose can be manufactured from piece goods and cut to a desired length in each individual instance.

The construction of the hose according to the present invention offers a multiplicity of possibilities: for example, next to the central tubular core, which serves to feed the melted adhesive, a second flexible tube may be arranged so that both tubes would be wrapped about by the same heating band. It is also possible to place the heating tape between two tubes. Further it is possible to divide the core by a partition wall into two chambers and use an extensible flexible plastic tube in which the pressure of air would be adjusted to the pressure of an adhesive.

It is further advantageous that the passage may extend about the core over a helical path, whereby the air passage is substantially longer than the core. It is possible thereby that the temperature of pressure air is gradually adapted to that of the melted adhesive without requiring that the heating tape should have a substantially higher temperature because the sufficient heating of pressure air is ensured by the long contact surface between the wall of the air passage and the air passing through the passage even if the heating tape has relatively low temperatures. Therefore the risk of a local overheating of the melted adhesive is prevented and at the same time already available heating and controlling arrangements of conventional hoses of this type can be practically utilized without any modifications. In this instance the heating tape will have a higher current consumption and a supporting control.

Since the spiral shape of the air passage with comparatively short hoses for melted adhesive results in relatively long air passage which has accordingly a greater resistance to air, it is possible to enlarge the cross-section of the air passage while at the same time maintaining the overall stream losses so that the danger of clogging of the air passage would be reduced.

The spiral shape of the air passage further prevents that the air passage could be clamped due to a non-allowable bending of the hose.

As mentioned above it is possible that the air passage could be formed by a flexible tube which would be spiral-shaped and disposed about the core or the heating tape.

In a further modification of the present invention the outer layer of thermal insulation may be radially spaced from the central core to form a ring-shaped space therebetween, said heating tape being disposed in said space, said passage being formed in said space between adjacent turns of said helical heating tape, which are spaced from each other at intervals along the length of the core. It is also possible to form the heating tape with a number of pitches so that a plurality of air passages would be provided.

In order to prevent that the melted adhesive from being cooled in the region of the air-admitting means of the hose by the pressure air, the air-admitting means and the air-discharging means are not simply arranged on the end faces of the hose but rather penetrate the outer layer of thermal insulation and open into the air passage.

The hose may further include a protective steel sleeve immediately surrounding said central core, said heating tape being wrapped around said steel sleeve.

The hose may also include an additional sleeve of fiber glass interpositioned in said space between said heating tape and said outer layer, said additional sleeve radially limiting the air passage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a partially sectional axial view through the hose of this invention; and FIG. 3 is a sectional view through the hose of FIG. 2.

DETAILED DESCRIPTION OF THE PREFERRED EMBODIMENT

Figure 1:
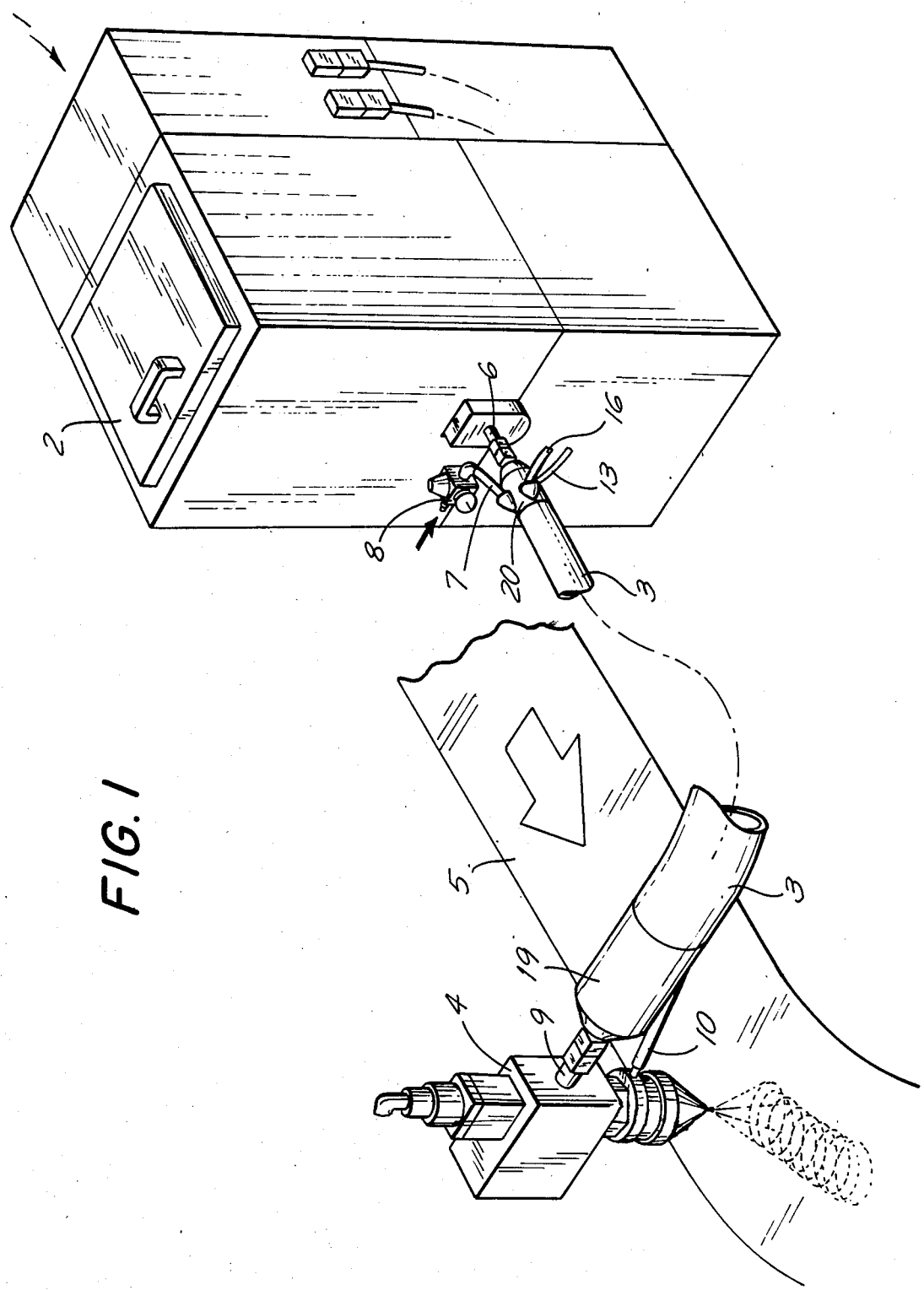
FIG. 1 is a schematic illustration of the arrangement for the application of a melted adhesive.

Referring now to the drawings in detail, and first to FIG. 1, the device for the application of a fusion adhesive includes an apparatus 1 for liquifying an adhesive and a spraying head 4 for applying a fusion adhesive received from the apparatus 1 onto a tape 5. The apparatus for liquifying a meltable or fusion adhesive 1 is of a conventional design which is disclosed in DE-OS No. 28 36 545. The adhesive-liquifying apparatus 1 includes at the top side thereof a cover 2 which closes the apparatus after the apparatus has been filled with an adhesive.

The device illustrated in FIG. 1 is shown on a larger scale at the left-hand side than at the right-hand side. The spraying head 4 and adhesive-liquifying apparatus 1 are connected to each other by a hose 3 of the present invention. Hose 3 opens into the adhesive-spraying head 4, on the underside of which an adhesive sprayed therefrom is schematically shown. The fusion adhesive is sprayed onto tape 5 to be coated. The material tape 5 is displaceable under the spraying head 4 in the direction shown by the arrow.

The fusion adhesive-conveying hose 3 has at its inlet end a connection element 6 which is coupled to a respective counter-connection element provided in the liquifying apparatus 1. At the outlet end the hose 3 has another connection element 9 which is also coupled to a respective counter-connection element mounted in the spraying head 4.

Three connections lead outwardly through the outer wall of the hose 3 at the inlet end of the hose. One of these connections is a pressure air inlet hose 7 which is in communication with a pressure air-regulating valve 8 charged with pressure air in the direction of the arrow. Two further conduits which penetrate the outer wall of hose 3 are connected via respective plugs to the adhesive-liquifying apparatus 1, and of which one conduit is a heating tape extended in the interior of the hose and connected to a respective supply and another conduit is a control conduit, which will be explained below with the reference to FIGS. 2 and 3.

An outlet hose 10 penetrates the outer wall of hose 3 and extends outwardly of the hose 3 at the outlet end of hose 3. Hose 3 conveying heated air, opens into the spraying head 4 at the underside of the latter.

The device depicted in FIG. 1 operates in the following mode:

Meltable adhesive which was charged into the apparatus 1 via cover 2 is warmed-up in apparatus 1 and therefore liquified. The warmed-up and liquified adhesive is pumped into hose 3 by means of a non-illustrated conventional high-pressure positive displacement pump via the connection 6. At the same time cold pressure air is supplied in the direction of the arrow to the valve 8 and via the connection hose 7 into the hose 3.

The liquified adhesive leaves the hose 3 at the connection 9 at the temperature which is somewhat similar to that at which the adhesive enters the hose 3. The pressure air leaves the hose 10 at the outlet of hose 3 at the temperature of the adhesive. The so-preheated pressure air flows into the stream of the fusion adhesive in the spraying head 4 so that the adhesive is atomized whereby the respectively heated air stream has such a temperature that, on the one hand, it prevents the adhesive from being prematurely solidified upon the application on the material tape 5, and, on the other hand, it prevents an overheating of the adhesive while the latter exits from the spraying head 4.

With reference to FIGS. 2 and 3 it will be seen that the adhesive-conveying hose 3 includes an inner core 11 which is formed of a flexible tube made out of plastic. This tube material is selected so that, on the one hand, it is resistant to high temperatures up to about 250° C., and, on the other hand, it has a small heat transmission coefficient and is also erruption-resistant. The inner core 11 is surrounded with a protective sleeve 12 made of steel. A heating tape 13 is helically wrapped around the protective sleeve 12. The heating tape 13 has two leads connected to each other. The leads together form the coils spaced at intervals from each other and wrapped about the steel sleeve 12. The distance between individual pitches of the turns of tape 13 amounts to about 4 mm.

A protective sleeve 15 made out of fiber glass slips over the heating tape 13. Sleeve 15 is flexible and provides that a smallest possible radius of bending of the hose is within the estimated one. The pfotective sleeve 15 due to its stability in shape covers the heating tape 13 in such a fashion that between the individual turns of the heating tape 13 wound about steel sleeve 12 a spiral or helical air passage 14 is formed, which as seen in FIG. 3, is radially limited between the inner surface of fiber glass sleeve 15 and the outer surface of steel sleeve 12. The air passage 14 is limited in the axial direction by the length of heating tape 13.

Control conduits 16 are wrapped about the protective sleeve 15 in such a fashion that they can not be damaged upon bending of hose 3. Control conduits 16 are embedded in thermal insulation layer 17 made of silicon foam, which concentrically surrounds the sleeve of fiber glass 15 and has the thickness of about 12 mm. A further outer protective sleeve 18 of plastic is applied onto the outer surface of insulation 17 and is adhered thereto. Air passage 14 is clearly seen in FIG. 3.

The melted adhesive hose 3 described herein above has preferably the length about 2 m; the hose core 11 has the inner diameter about 8 mm, whereas the air passage 14 has such a cross-section that it forms somewhat like a rectangle with the length of the edge being 3 or 4 mm. The pressure air connections 7 and 10 and the current connections for heating tape and, conduits 16 are extended outwardly from the reinforced silicon end cups 19, 20 provided on the ends of hose 3.

It will be understood that each of the elements described above, or two or more together, may also find a useful application in other types of hoses for conveying meltable adhesives differing from the types described above.

While the invention has been illustrated and described as embodied in a hose for conveying a meltable adhesive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hose for feeding a melted adhesive from an adhesive-liquifying device to an adhesive-spraying head, comprising a flexible tubular central core made of plastic for feeding an adhesive therethrough; a helical electric heating tape provided on the exterior of said core, said heating tape being helically wrapped around said core so that said tape has adjacent turns spaced from each other; an outer layer of thermal insulation surrounding said heating tape and said central core, said layer of thermal insulation being radially spaced from said central core to form a ring-shaped space therebetween, said heating tape being disposed in said space; an inlet end for connection to the adhesive-liquifying device; an outlet end for connection with the adhesive-spraying head, said hose being provided with an air passage disposed in heat-transmitting relation with said heating tape, said air passage being defined between surfaces of said helically wrapped heating tape, said core and an inner surface of said outer layer whereby said passage extends about said core over a helical path; air-admitting means provided on the hose in the region of said inlet end and connected to said passage; and air-discharging means provided on the hose in the region of said outlet end and connected to said passage, whereby air entering said air-admitting means is heated while flowing through said passage and enters the adhesive-spraying head via said air-discharging means in pre-heated condition to atomize an adhesive sprayed out from the adhesive-spraying head.

2. The hose as defined in claim 1, wherein said air-admitting means and said air-discharging means are tubular members penetrating said layer of thermal insulation.

3. The hose as defined in claim 2, further including a protective sleeve immediately surrounding said central core, said tape being wrapped around said steel sleeve.

4. The hose as defined in claim 3, and further including an additional sleeve of fiber glass interpositioned in said space between said heating tape and said outer layer, said additional sleeve radially limiting said passage.

* * * * *